(12) United States Patent
Sugimoto (10) Patent No.: US 6,357,094 B1
(45) Date of Patent: Mar. 19, 2002

(54) MACHINE TOOL

(75) Inventor: Yoshiaki Sugimoto, Yamatokoriyama (JP)

(73) Assignees: Mori Seiki Co., Ltd., Yamatokoriyama (JP); Intelligent Manufacturing Systems International, Sacramento, CA (US)

( * ) Notice: Subject to any disclaimer, the term of this patent is extended or adjusted under 35 U.S.C. 154(b) by 0 days.

(21) Appl. No.: 09/674,005

(22) PCT Filed: Feb. 26, 1999

(86) PCT No.: PCT/JP99/00971

§ 371 Date: Oct. 24, 2000

§ 102(e) Date: Oct. 24, 2000

(87) PCT Pub. No.: WO00/51779

PCT Pub. Date: Sep. 8, 2000

(51) Int. Cl.⁷ .............................. B23B 39/14; B23C 1/12
(52) U.S. Cl. ...................... 29/27 C; 29/26 A; 409/201; 409/202; 409/212; 409/216
(58) Field of Search ................ 29/27 C, 27 R, 29/26 A, 39, 40; 409/202, 212, 235, 204, 206, 211, 216, 203, 207, 201

(56) References Cited

U.S. PATENT DOCUMENTS

| | | | |
|---|---|---|---|
| 4,178,834 A | * | 12/1979 | Holmstrom .............. 409/207 X |
| RE31,288 E | * | 6/1983 | Matsuzaki et al. .......... 29/27 C |
| 4,543,020 A | * | 9/1985 | Shtipelman .................. 29/26 R |
| 4,658,485 A | * | 4/1987 | Yang .......................... 29/26 A |
| 5,314,397 A | * | 5/1994 | Mills et al. .............. 409/212 X |

FOREIGN PATENT DOCUMENTS

| | | | | |
|---|---|---|---|---|
| JP | 53-35813 | 9/1978 | | |
| JP | 63-38944 | 3/1988 | | |
| JP | 63-38945 | 3/1988 | | |
| JP | 63-94641 | 6/1988 | | |
| JP | 1-222809 | 9/1989 | | |
| JP | 6-320368 | 11/1994 | | |
| JP | 8-206936 | 8/1996 | | |
| JP | 9-262727 | 10/1997 | | |
| JP | 10-309642 | 11/1998 | | |
| SU | 738786 | * | 6/1980 | ................. 409/212 |
| SU | 1774905 | * | 11/1992 | ................. 409/202 |

* cited by examiner

*Primary Examiner*—William Briggs
(74) *Attorney, Agent, or Firm*—Armstrong, Westerman & Hattori, LLP (57) ABSTRACT

The invention relates to a machine tool comprising feeding system to linearly feed a slide to be fed (5). Each feed gear comprises a first and a second feed mechanisms provided to be in a parallel manner and spaced apart from each other by a specified interval therebetween, wherein each feed mechanism comprises a linear feed-driving means, a feed-moving body which engages with the feed-driving means and moves along the feed-driving means, and a position sensor to detect positions of the feed-moving body along the feed-driving means. Each feed gear further comprises a first and a second support mechanisms respectively connected to each feed-moving body of the first and the second feed mechanisms with rotatably supporting the slide to be fed (5), and a controller (60) for controlling operations of the first and the second feed mechanisms respectively. In addition, at least either of support portions of the first and the second support mechanisms for rotatably supporting the slide to be fed (5) is provided to be movable in such a direction as separating from the other, rotating the slide to be fed (5) according to a difference in moving amount of the feed-moving bodies. Since the slide to be fed (5) is provided to be rotative, even such parts as having complicated surfaces can be easily machined.

5 Claims, 5 Drawing Sheets

MACHINE TOOL

BACKGROUND OF THE INVENTION

1. Field of the Invention

The present invention relates to a machine tool such as a lathe, a milling machine, a machining center etc. comprising feeding system to linearly feed a tool rest, a tool post, a tool slide, a tool box and a slide to be fed such as a spindle head, a table etc.

2. Description of the Prior Art

An conventional general machine tool comprises feeding system composed of linear feed-driving means such as a ball screw etc., feed-moving bodies such as a ball nut etc. which engage with the feed-driving means and move along them, and position sensors such as a rotary encoder etc. to detect positions of the feed-moving bodies along the feed-driving means. The feeding system drive above-mentioned tool rest etc. and the slide such as the spindle head, the table etc. to move them linearly.

For example, the machining center comprises a table for installing an object to be machined (hereinafter referred to as a work piece) thereto, a spindle which is rotatably supported and can hold a tool at a front end portion thereof, and three pairs of feeding system which relatively move the table and the spindle in the mutually orthogonal three axes directions. Hence, through the relative displacement of the table and the spindle in the above-mentioned three orthogonal axes directions by driving the three pairs of feeding system, a three-dimensional machining can be realized for the work piece put on the table.

The above-mentioned three pairs of feeding system are disposed so that the each feed-driving means is mutually orthogonal, the table is driven by the first feed gear provided with the horizontal feed-driving means, and the spindle is driven by the second and the third feeding system whose feed-driving means are mutually orthogonal as well as at right angles to feed-driving means of the first feed gear. Generally, one feed gear is formed of one feed-driving means, and the slide to be fed such as above-mentioned table is driven by such feed gear and also guided by linear guide mechanisms (for example a rolling guide and a sliding guide etc.) arranged at both sides of the feed-driving means, the slide moving along the linear guide mechanisms.

There are work pieces not only having the comparatively simple work surfaces such as a horizontal surface and a perpendicular surface but also having complicated surfaces that need complex machining such as an inclined surface and a curved surface.

However, in the conventional machine tool comprising above-mentioned feeding system, since the spindle is driven so that it executes a parallel movement in a three-dimensional space with keeping a previously set posture thereof, that is to say, since it is impossible to swing the spindle in such a manner that a spindle center obliquely crosses feed directions of the feeding system, the work piece having above-mentioned complicated surface cannot be machined.

Figure 6:
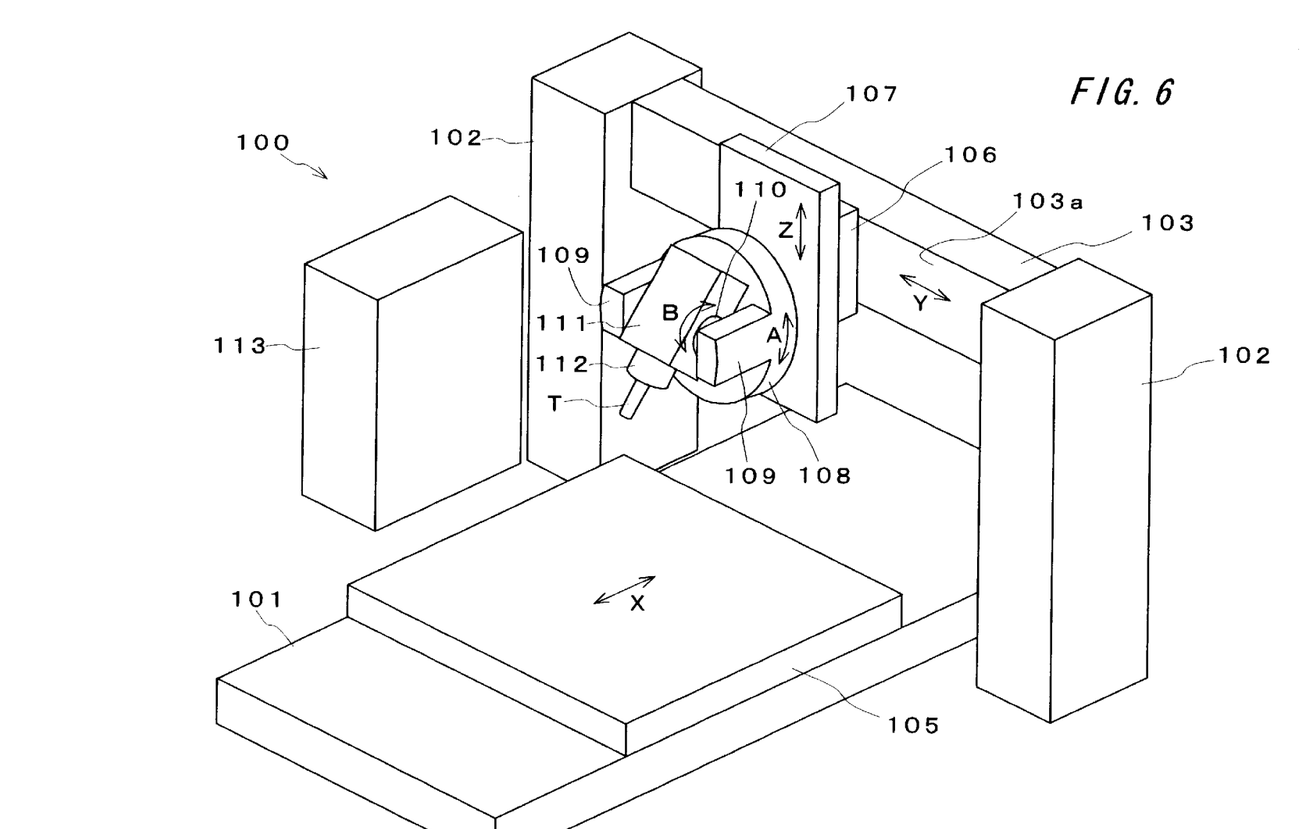
FIG. 6 is a perspective view illustrating an conventional machining center.

For solving this problem, such a machining center as shown in FIG. 6 has been developed. As shown in FIG. 6, a machining center 100 comprises a bed 101, a pair of columns 102 and 102 respectively erected from both sides of the bed 101, and a cross beam 103 horizontally linked with upper end portions of the column 102 and 102.

A table 105 which is driven by the first feed gear (not shown) having above-mentioned construction and reciprocally moves in the X-axis direction indicated by an arrow (X) is mounted on the bed 101, and a saddle 106 which is driven by the second feed gear (not shown) and reciprocally moves in the Y-axis direction indicated by an arrow (Y) is disposed at a front face 103a of the cross beam 103, and a slide 107 which is driven by the third feed gear (not shown) and reciprocally moves in the Z-axis direction indicated by an arrow (Z) is disposed at a front of the saddle 106. A head holder 108 which is driven by a first rotary feed gear (not shown) comprising a drive motor and a worm gear etc. and rotates in the direction of an arrow A is disposed at a front of the feed slide 107. A spindle head 111 which is supported by a support shaft 110, driven by a second rotary feed gear (not shown) comprising a drive motor etc., rotating in the direction of an arrow B is disposed between a pair of support arms 109, 109 of the head holder 108. The spindle head 111 rotatably supports a spindle 112 having a front end portion to hold a tool T and axially rotates the spindle 112 by an appropriate drive means such as a built-in drive motor (not shown) etc.

Hence, above-mentioned each feed gear (not shown) and the drive means (not shown) are controlled in their operations by a controller 113.

In the machining center 100 comprising above-mentioned composing elements, the table 105 and the spindle 112 can be relatively moved in the X-axis, Y-axis and Z-axis directions respectively by driving and controlling above-mentioned each feed gear (not shown) and the drive means (not shown) owing to the controller 113, furthermore, the spindle 112 can swing so that the spindle center thereof obliquely crosses the driving directions of the feeding system (not shown). Thus, the spindle 112 can be linearly and curvilinearly moved in the three-dimensional space. Therefore, the work pieces having the complicated surfaces are continuously machined at a time with being fixed on the table 105.

However, there is another defect as described below in the machining center 100 which enabled above-mentioned complicated machining.

The head holder 108 and the spindle head 111 are driven by the rotary feeding system comprising the drive motor and the worm gear etc., rotating in the directions of the arrow A and the arrow B respectively, whereby needing complicated constructions thereof, as a result the size of a mechanism itself becomes large in view of strength thereof. In addition, since the rotary feeding system must be stored in a limited space, they cannot be produced easily, consequently a manufacturing cost is heightened. It is also problem on accuracy that the rotary feeding system using the worm gear etc., have many error factors such as a backlash which disables a precise control of the head holder 108 and the spindle head 111.

It is a general advantage of the present invention to solve above-mentioned problems and to provide an improved machine tool which can linearly move a tool rest etc. and a slide to be fed such as a spindle head, a table etc. and comprises feeding system to rotate the slide so as to obliquely cross the directions of above-mentioned linear motions. A further advantage is to provide a machine tool comprising above-mentioned feeding system to machine work pieces having complicated surfaces.

SUMMARY OF THE INVENTION

The foregoing advantages are accomplished by the present machine tool that comprises feeding system to linearly feed a slide to be fed. In the machine tool, each feed gear comprises a first and a second feed mechanisms which are provided in parallel manner spaced apart from each other by a specified interval therebetween respectively comprising: a linear feed-driving means, a feed-moving body which engages with the feed-driving means and moves along the feed-driving means and a position sensor to detect positions of the feed-moving body along the feed-driving means, a first and a second support mechanisms which are respectively connected to each feed-moving body of the first and the second feed mechanisms and rotatably support the slide to be fed, and a control means to independently control the feed motions of the first and the second feed mechanisms, wherein at least either of support portions of the first and the second support mechanisms rotatably supporting the slide to be fed is disposed so as to move in such a direction as being separated from the other, and the slide to be fed is rotated on the basis of a difference in moving amount of the feed-moving bodies.

According to the present invention, two feed-moving bodies can be synchronously moved by independently controlling the feed motions of the first and the second feed mechanisms, on the other hand, those two feed-moving bodies can be moved in such a manner that there is a difference in moving amount therebetween. For synchronously moving two feed-moving bodies, the slide to be fed can be moved in a parallel manner, while for moving them such that there is a difference in moving amount therebetween, at least either of the support portions of the first and the second support mechanisms moves so as to separate from the other on the basis of the movements of the feed-moving bodies, as a result the slide to be fed rotates within a plane including two feed-driving means, consequently the slide to be fed moves with being rotated in the feeding directions of the first and the second feed mechanisms.

As mentioned above, in the present invention, the slide to be fed can be rotated. Therefore, even though a work piece has a complicated surface, it can be easily machined. In addition, since the slide to be fed can be rotated by one feed gear, the structure of the feed gear itself is made simple, consequently there is such an advantage that the machine tool in the present invention can be produced easily in comparison with an conventional one, as a result a manufacturing cost can be lowered.

There is another advantage that the support portions in the present invention can be disposed so as to be linearly moved relative to the slide to be fed. Thus, a simple and precise mechanism to move the support portions can be attained.

In addition, the feed-driving means in above-mentioned present invention can be composed of a linear motor. The drive means with using the conventional worm gear as described above have many error factors such as a backlash, therefore the slide to be fed cannot be precisely rotated. However, by using the linear motor, such error decreases, whereby the slide to be fed can be precisely rotated.

Furthermore, when the slide to be fed is provided with a tool hold mechanism to hold a tool, the tool can be linearly moved in the feeding directions of the feeding system and also can be rotated, whereby it is possible to machine the work piece having the complicated surface such as a curved one.

Furthermore, the machine tool in the present invention can comprise a pair of columns disposed in a parallel manner being spaced away from each other by a specified interval therebetween, a cross beam linked with the columns, and a table that is provided under the cross beam and is allowed reciprocating in orthogonal direction of the cross beam, wherein the first and the second feed mechanisms are disposed at a front face of the cross beam, the slide is provided with the tool hold mechanism to rotatably hold the tool, and the tool hold mechanism is movable across the feed-driving means. In such construction, the table and the tool hold mechanism can be linearly moved in two-axial directions of a moving direction of the table and a longitudinal direction of the cross beam both of which are disposed at right angles to each other, also can be linearly moved relative to such a direction as crossing above-mentioned two axes. In addition, the tool hold mechanism can be rotated within the plane including the first and the second feed mechanisms, whereby the work pieces having the complicated surfaces such as the curved ones etc. can be continuously machined at a time with being fixed on the table. Furthermore, when a circular table which can be horizontally rotated is set on the table, it is also possible to continuously machine work pieces having more complicated shapes at a time with being fixed on the table.

DETAILED DESCRIPTION OF THE PREFERRED EMBODIMENTS

Several embodiments of the present invention will hereinafter be described with reference to the installed drawings.

Figure 1:
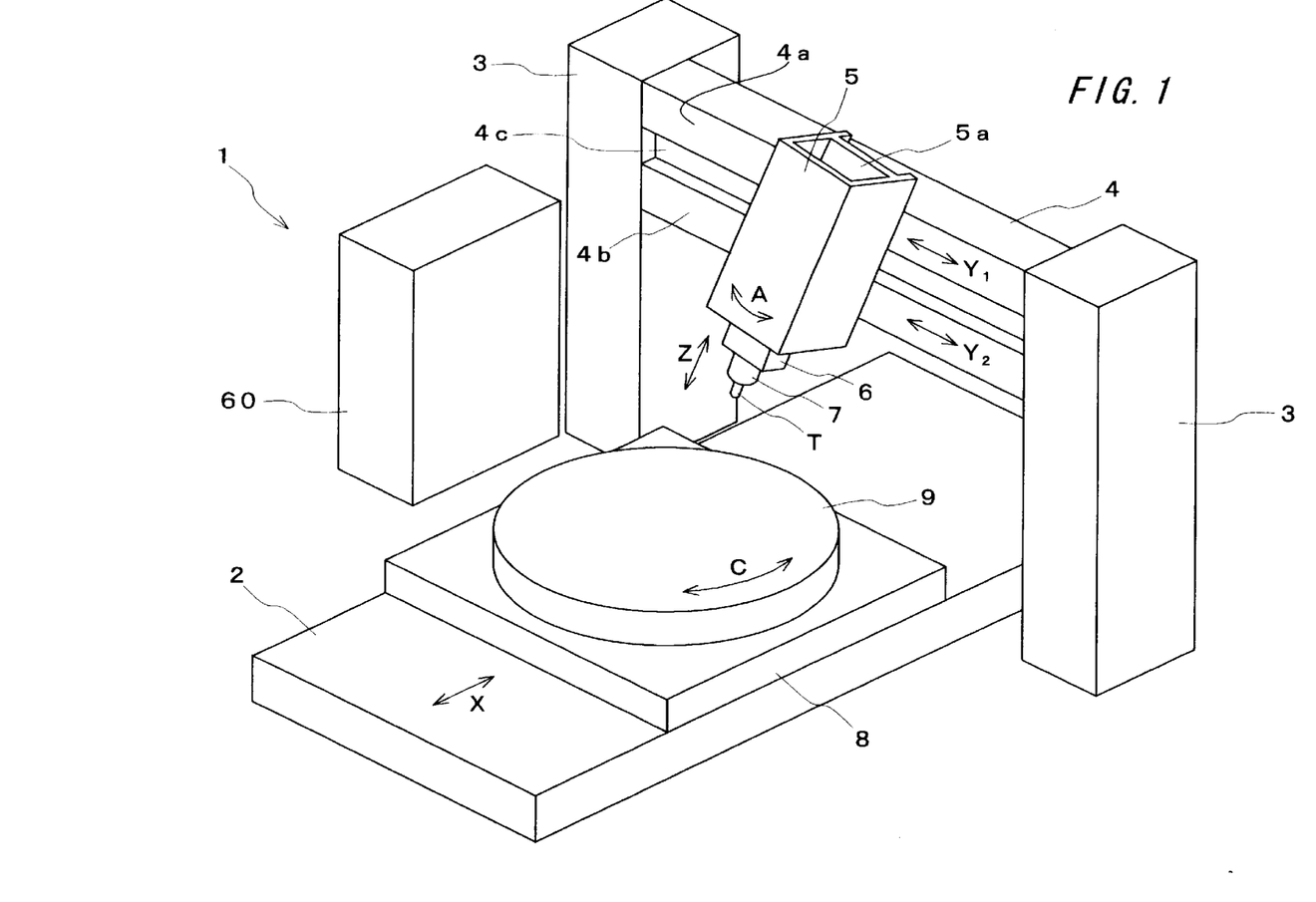
FIG. 1 is a perspective view illustrating a preferred machine tool concerning the present invention.

As shown in FIG. 1, a machine tool according to the present invention is classified into an elevation type machining center, comprising a bed 2, a pair of columns 3, 3 erected from both sides of the bed 2, a cross beam 4 horizontally linked with upper end portions of the columns 3, 3, and a controller 60 for controlling operations of after-mentioned feeding system etc. as basic composing elements.

A table 8 which is driven by the feeding system (not shown) and reciprocally moves in the X-axis direction indicated by an arrow (X) is mounted on the bed 2. A circular table 9 which is driven by a rotary feed gear (not shown) comprising a drive motor and a worm gear etc. and rotating in the direction of an arrow C is mounted on the table 8.

Figure 2:
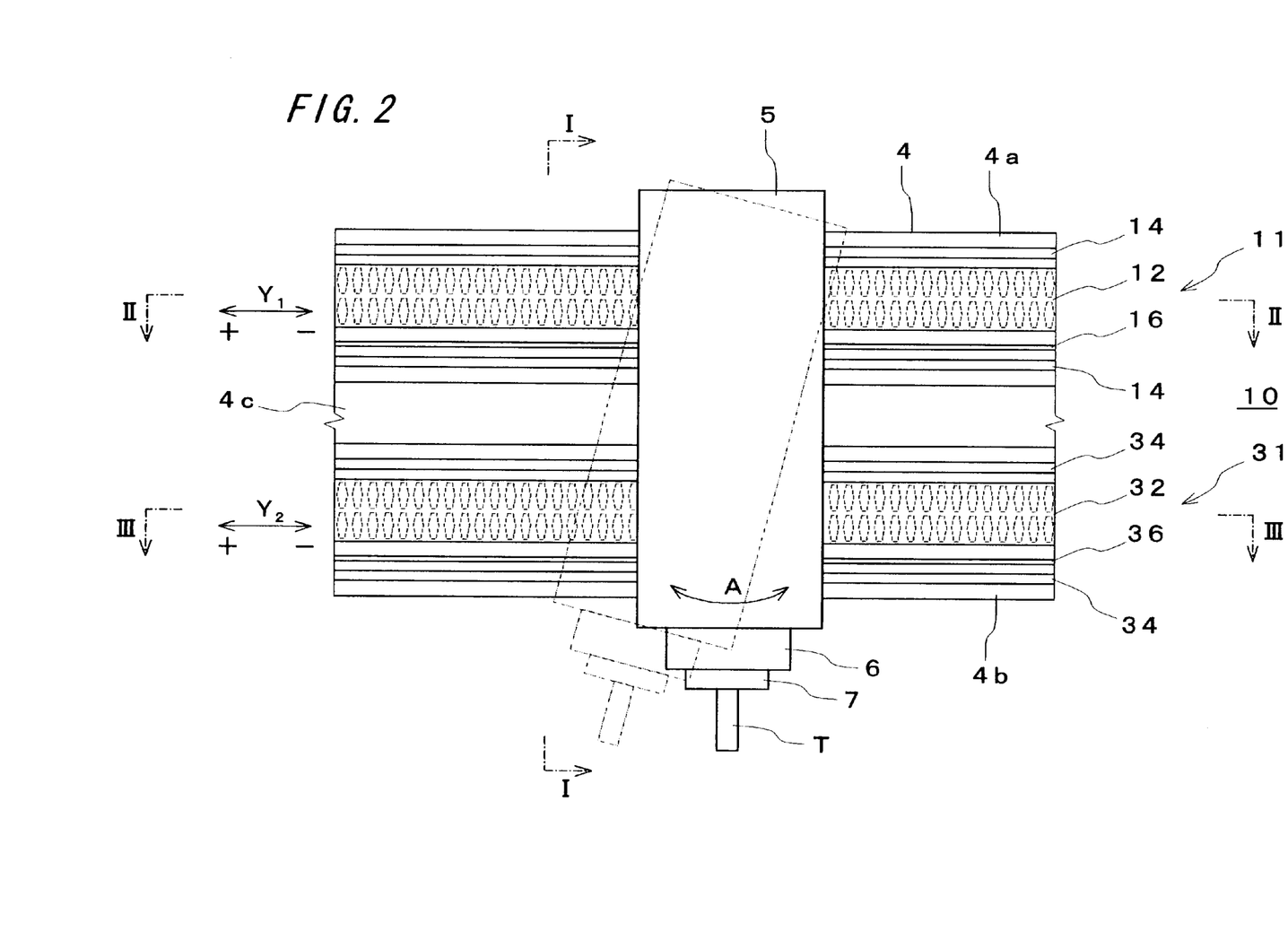
FIG. 2 is a greatly enlarged front elevation illustrating a spindle head and a cross beam of the machine tool shown in FIG. 1.
Figure 3:
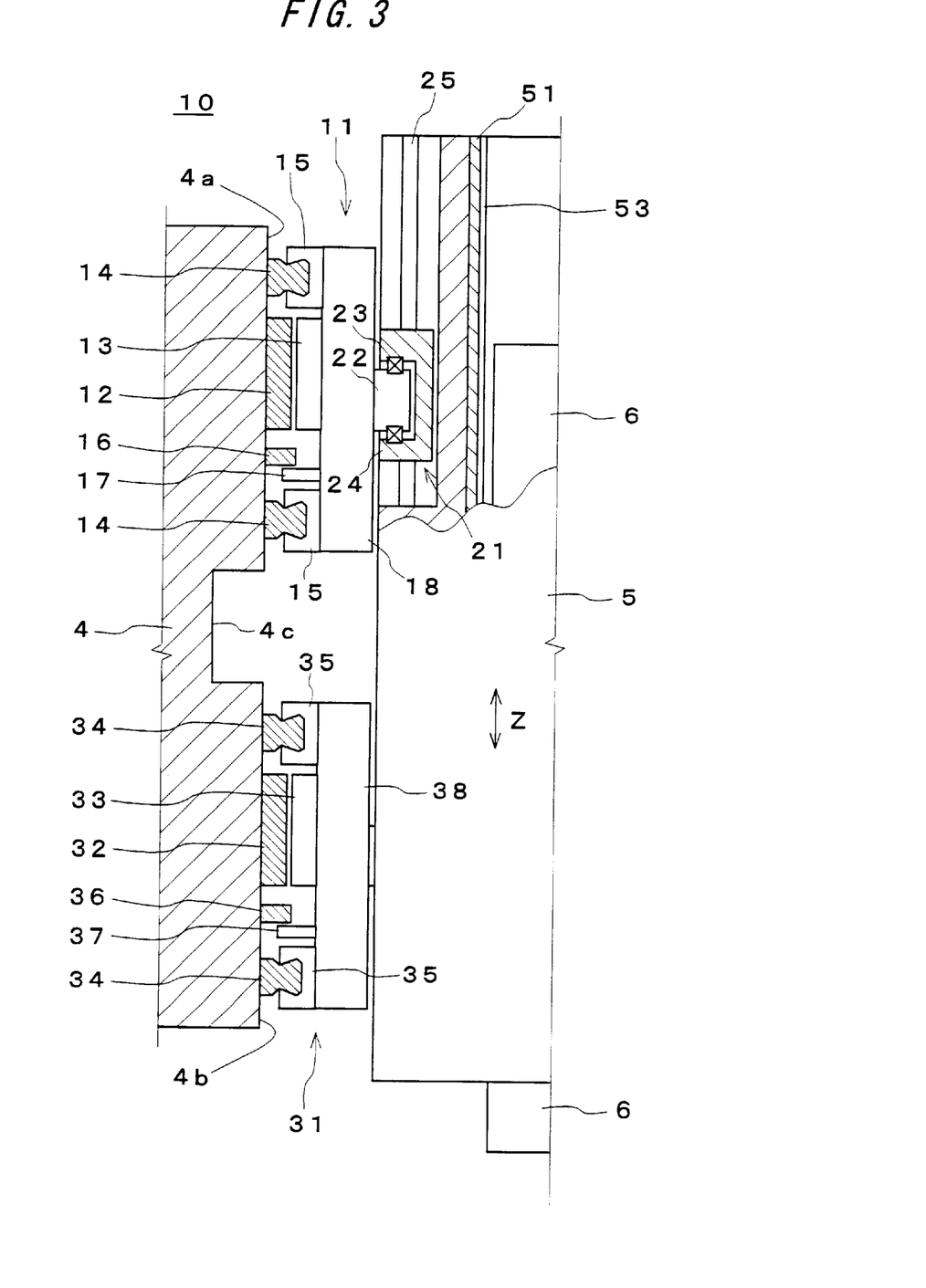
FIG. 3 is a cross-sectional view taken in the direction indicated by the arrow I—I shown in FIG. 2.

As shown in FIG. 2 and FIG. 3, a front of the cross beam 4 is divided into an upper-side plane 4a and a lower-side plane 4b by means of a concave area 4c formed along the longitudinal direction of the front. A first feed mechanism 11 is provided along the upper-side plane 4a, while a second feed mechanism 31 is provided along the lower-side plane 4b.

The first feed mechanism 11 comprises a linear magnet plate 12 in which magnetic poles excited to a N-pole and a S-pole are alternately arranged, a linear scale 16 placed along the magnet plate 12, a pair of guide rails 14, 14 arranged along the magnet plate 12 and the linear scale 16 in such a manner as holding them, slide bearings 15, 15 which respectively engage with the guide rails 14, 14 and move along them, a feed-moving body 18 fixed to the slide bearings 15, 15, a stator 13 fixed to the feed-moving body 18 so as to face the magnet plate 12, and a detection amplifier 17 fixed to the feed-moving body 18 so as to face the linear scale 16.

The stator 13 constructs the linear motor together with the magnet plate 12. An electric power is supplied from the controller 60. Magnetic poles on the stator 13 are excited to a N-pole and a S-pole by means of such electric power. The stator 13 and the feed-moving body 18 joined therewith are guided to the guide rails 14, 14 by an absorptive and a repulsive forces generated between the stator 13 and the fixed poles on the magnet plate 12, moved to the Y1-axis direction indicated by an arrow (Y1). A scale on the linear scale 16 is read by the detection amplifier 17, thus positions of the feed-moving body 18 on the linear scale 16 can be always detected by the detection amplifier 17.

The second feed mechanism 31 has the same construction as that of the first feed mechanism 11, comprising a magnet plate 32, a linear scale 36, a pair of guide rails 34, 34, slide bearings 35, 35, a feed-moving body 38, a stator 33, and a detection amplifier 37. As in the first feed mechanism 11, when an electric power is supplied to the stator 33 from the controller 60, an absorptive and a repulsive forces generate between the stator 33 and fixed poles on the magnet plate 32, whereby the stator 33 and the feed-moving body 38 joined therewith are guided to the guide rails 34 and 34, moved to the Y2-axis direction indicated by an arrow (Y2). Positions of the feed-moving body 38 on the linear scale 36 are always detected by the detection amplifier 37.

As described above, the controller 60 is connected to the stators 13, 33 and to the detection amplifiers 17, 37, receiving signals detected by the detection amplifiers 17, 37, controlling the electric powers supplied to the stators 13, 33 independently according to the signals, furthermore controlling the movements of the stator 13 and the feed-moving body 18 joined therewith in the Y1-axis direction indicated by the arrow (Y1) and the movements of the stator 33 and the feed-moving body 38 joined therewith in the Y2-axis direction indicated by the arrow (Y2).

Figure 4:
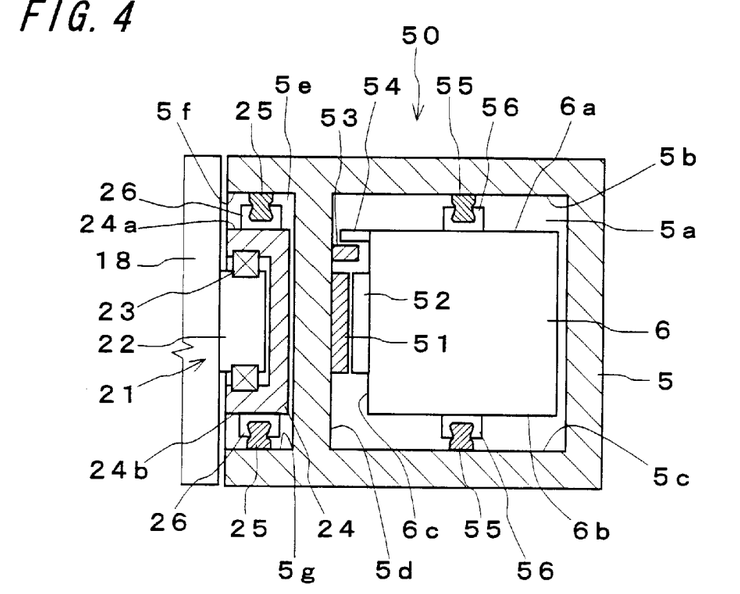
FIG. 4 is a cross-sectional view taken in the direction indicated by the arrow II—II shown in FIG. 2.
Figure 5:
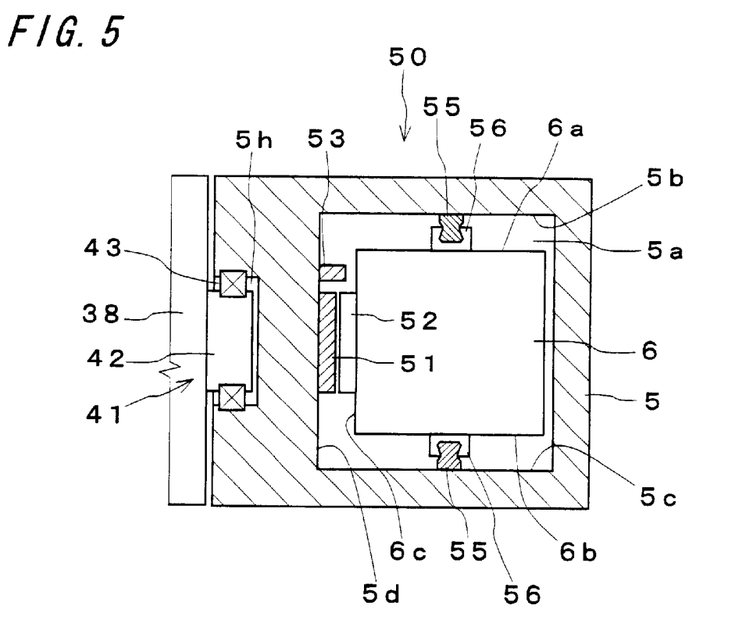
FIG. 5 is a cross-sectional view taken in the direction indicated by the arrow III—III shown in FIG. 2.

As shown in FIG. 4 and FIG. 5, the feed-moving body 18 of the first feed mechanism 11 and the feed-moving body 38 of the second feed mechanism 31 are respectively provided with a first support mechanism 21 and a second support mechanism 41, wherein the first support mechanism 21 and the second support mechanism 41 rotatably support a spindle head 5 as a slide to be fed.

The first support mechanism 21 comprises a support shaft 22 erected from the feed-moving body 18, a housing 24 which is rotatably connected to the support shaft 22 through a bearing 23, guide rails 25, 25 which guide the housing 24, and slide bearings 26, 26 which respectively engage with the guide rails 25, 25. The housing 24, the guide rails 25, 25, and the slide bearings 26, 26 are arranged in a space 5e formed in the spindle head 5 at such a side thereof as facing the feed-moving body 18. More precisely to say, the guide rails 25, 25 are perpendicularly fixed to facing inside walls 5f, 5g of the space 5e. The slide bearings 26, 26 which respectively engage with the guide rails 25, 25 are fixed to outer surfaces 24a, 24b of the housing 24. According to above-mentioned construction, the spindle head 5 is rotatably supported by the first support mechanism 22. The support shaft 22, the bearing 23, the housing 24, and the spindle head 5 are in such a condition that they can relatively move.

On the other hand, the second support mechanism 41 comprises a support shaft 42 erected from the feed-moving body 38, and a bearing 43 which is held inside of a hole 5h formed in the spindle head 5 and is connected to the support shaft 42, wherein the spindle head 5 is rotatably supported by the support shaft 42 and the bearing 43.

As described above, a first feed gear 10 is composed of the first feed mechanism 11, the second feed mechanism 31, the first support mechanism 21, the second support mechanism 41, and the controller 60 which controls the operations of the first feed mechanism 11 and the second feed mechanism 31.

As shown in FIG. 1, FIG. 4, and FIG. 5, a space 5a is formed so as to vertically thrust the spindle head 5. A spindle quill 6 is provided in the space 5a so as to move in the Z-axis direction indicated by an arrow (Z) in the direction along the length of the spindle head 5) with being driven by the second feed gear 50.

The second feed gear 50 comprises almost same composing elements as the first feed mechanism 11 and the second feed mechanism 31, comprising a magnet plate 51, a linear scale 53, a pair of guide rails 55, 55, slide bearings 56, 56, a stator 52, and a detection amplifier 54 etc.

The pair of guide rails 55, 55 are fixed perpendicular to facing inside walls 5b, 5c of the space 5a. The slide bearings 56, 56 which engage with the guide rails 55, 55 are fixed to outer surfaces 6a, 6b of the spindle quill 6 respectively. The spindle quill 6 can be moved in the Z-axis direction indicated by the arrow (Z) with being guided by the guide rails 55, 55 as well as slide bearings 56, 56.

The magnet plate 51 and the linear scale 53 are fixed parallel to each other and perpendicular to an inside wall 5d of the space 5a. The stator 52 and the detection amplifier 54 are fixed parallel to each other to an outer surface 6c of the spindle quill 6 so that they face the magnet plate 51 and the linear scale 53 respectively. An electric power is supplied to the stator 52 from the controller 60 as in the first feed mechanism 11 and the second feed mechanism 31, whereby an absorptive and repulsive forces generate between the stator 52 and fixed poles of the magnet plate 51 so as to drive the stator 52 in the Z-axis direction indicated by the arrow (Z), consequently the spindle quill 6 joined with the stator 52 also moves in the Z-axis direction. Positions of the spindle quill 6 on the linear scale 53 are always detected by the detection amplifier 54. The controller 60 receives signals detected by the detection amplifier 54, upon which controlling the electric power supplied to the stator 52, controlling the movements of the stator 52 and the spindle quill 6 joined therewith in the Z-axis direction indicated by the arrow (Z).

The spindle quill 6 rotatably supports a spindle 7 that can hold a tool T at a front end portion thereof. The spindle 7 can be axially rotated by a built-in drive motor.

The same composing elements as the first feed gear 10 and the second feed gear 50 can be adopted to the feeding system (not shown) for driving the table 8, while other mechanism composed of a ball screw, a ball nut, and a servo motor etc. can be adopted, too. The feeding system (not shown), the rotary feed gear (not shown) to drive the circular table 9, and the drive motor to rotate the spindle 7 are also to be controlled in their operations by the controller 60. The machine tool 1 also comprises a tool changing apparatus (not shown in particular) provided to appropriately change the tool T held by the spindle 7.

An operating condition of the machine tool 1 in this embodiment comprising above-mentioned composing elements is described below with centering on the operation of the first feed gear 10 as a characteristic element. Hence, the spindle head 5 is in such a condition that the longitudinal direction thereof is vertically kept in its initial condition as shown in FIG. 2.

As described above, the controller 60 receives the signals detected by the detection amplifiers 17, 37, controlling the electric powers supplied to the stators 13, 33 respectively, controlling the movements of the stator 13 and the feed-moving body 18 joined therewith in the Y1-axis direction indicated by the arrow (Y1) as well as the movements of the stator 33 and the feed-moving body 38 joined therewith in the Y2-axis direction indicated by the arrow (Y2) respectively.

Therefore, the electric powers can be uniformly supplied from the controller 60 to the stators 13, 33. The spindle head 5 connected to the first support mechanism 21 and the second support mechanism 41 is moved parallel to the Y1-axis and Y2-axis directions with keeping its initial posture as described above when synchronously moving the stators 13, 33.

For example, in such a case that the electric power is supplied to the stator 13 so as to keep the position thereof while the electric power is supplied to the stator 33 so as to shift the position thereof and move same in the plus Y2-axis direction, the spindle head 5 rotates in the direction of an arrow A then stays in such a condition as shown by alternate long and two short dashes line in FIG. 2. This is because the spindle head 5 is rotatably supported by the first support mechanism 21 and the second support mechanism 41. At this time, the spindle head 5 rotates in the direction of the arrow A around the support shaft 42 owing to the structures of the first support mechanism 21 and the second support mechanism 41. On the other hand, the feed-moving body 18 and the spindle head 5 reciprocally rotate and move relative to the Z-axis, furthermore, the feed-moving body 18 and the feed-moving body 38 separate from each other according to the moving amount of the feed-moving body 38. This is because the support shaft 22 etc. of the first support mechanism 21 are disposed so as to move in relation to the spindle head 5 in the longitudinal direction thereof (in the Z-axis direction).

On the contrary, in the case that the electric power is supplied to the stator 33 so as to keep the position thereof while the electric power is supplied to the stator 13 so as to shift the position thereof and move same in the plus Y1-axis direction, the spindle head 5 rotates in reverse owing to the same action as described above.

When the electric power is supplied to each of the stator 13 and the stator 33 respectively such that moving rates thereof differ from each other, there is a difference between the moving amounts of the stator 13 and the stator 33 according to the supplied electric powers, whereby the spindle head 5 moves along the Y1-axis and the Y2-axis then rotates in the direction of the arrow A according to above-mentioned difference in moving amount of the stator 13 and the stator 33.

As mentioned above, the spindle head 5 can be moved parallel to the Y1-axis and the Y2-axis or can be rotated in the direction of the arrow A, furthermore, such movement and rotation can be simultaneously promoted through the control of the electric powers supplied to the stators 13, 33.

In addition, the spindle quill 6 can be moved in the Z-axis direction indicated by the arrow (Z) by appropriately supplying the electric power to the stator 52 of the second feed gear 50, while the table 8 can be moved in the X-axis direction indicated by the arrow (X) by driving the feeding system (not shown), furthermore the circular table 9 can be rotated in the direction of the arrow C by driving the rotary feed gear (not shown).

Thus, in the machine tool 1 in this embodiment, the circular table 9 can be moved in the direction of the arrow C and the X-axis direction, while the tool T can be moved in the Y1-axis and Y2-axis directions, the arrow A, as well as the Z-axis. Therefore, through the simultaneous driving and controlling of the circular table 9 and the tool T, a work piece and the tool T put on the circular table 9 and fixed thereto can be simultaneously moved relative to the directions of the arrow C, the X-axis, the Y1-axis, the Y2-axis and the arrow A, as well as the Z-axis. That is to say, the work piece and the tool T can be relatively moved in a three-dimensional space both in a linear and curvilinear manners. Thus, the work pieces can be continuously machined at a time with being fixed on the circular table 9 even though they have complicated surfaces to be machined such as curved ones etc.

Since the spindle head 5 is rotated only by the first feed gear 10 which plays a roll of a linear feed gear without using the rotary feed gear such as the drive motor and the worm gear, the structure of the rotary mechanism can be made simple, and besides the feed gear itself can be made compact. Furthermore, the machine tool 1 in this embodiment can be easily produced in comparison with the conventional machining center 100, therefore there is such an advantage that the manufacturing cost can be decreased.

In addition, since the first feed gear is composed of the linear motor, there happen few errors such as a backlash etc. in comparison with the rotary feed gear using the worm gear etc., therefore the spindle head 5 can be precisely rotated, consequently a precise machining is enabled.

Moreover, since the support shaft 22 and the housing 24 of the first support mechanism 21 are provided to be guided by the guide rails 25, 25 as well as the slide bearings 26, 26 so as to relatively move linear to the spindle head 5, the mechanism for moving the support shaft 22 and the housing 24 can be made comparatively simple and precise.

It is to be understood that the characteristic structure of the present invention is not only practiced in the feeding system of the spindle head 5 of the machining center as in this embodiment, but also carried out in the feeding system of the table 8 as well as those of a tool post of a lathe, those of a spindle slide as other machine tools, besides those of a spindle head or a table of a milling machine in other embodiments.

Furthermore, in this embodiment, the linear motor comprising the magnet plates 12, 32 and the stators 13, 33 is used for the first feed gear 10, while the linear motor comprising the magnet plate 51 and the stator 52 is used for the second feed gear 50. However, it is to be understood that the invention is not limited in this embodiment. Therefore, the feed mechanism comprising the ball screw, the ball nut, and the servo motor etc. can be used as each feed mechanism of the first feed gear 10 and the second feed gear 50.

Industrial Field of the Invention

As described above, the machine tool with respect to the present invention is adaptable to machine parts having complicated surfaces such as curved ones etc.

What is claimed is:

1. In a machine tool provided with feeding system to linearly feed a slide to be fed, each feed gear comprising:
   first and second feed mechanisms which are provided in a parallel manner spaced apart from each other by a specified interval therebetween, respectively comprising:

a linear feed-driving means, a feed-moving body which engages with the feed-driving means to move along the feed-driving means, and a position sensor to detect positions of the feed-moving body along the feed-driving means, first and second support mechanisms which are respectively connected to each feed-moving body of the first and the second feed mechanisms and rotatably support the slide, and a control means to control operations of the first and the second feed mechanisms respectively, a pair of columns which are disposed in a parallel manner being spaced away from each other by a specified interval therebetween, a cross beam which is horizontally linked with the columns, and a table that is provided under the cross beam and is allowed reciprocating in orthogonal direction of the cross beam, wherein at least either of support portions of the first and the second support mechanisms for rotatably supporting the slide is provided to be moved in such a direction to separate from the other so as to rotate the slide according to a difference in moving amount of the feed-moving bodies, wherein the first and the second feed mechanisms are disposed at a front face of the cross beam, the slide is provided with the tool hold mechanism to rotatably hold the tool, and the tool hold mechanism is movable across the feed-driving means.

2. A machine tool as set forth in claim 1 characterized in that the support portions are provided to be relatively movable linear to the slide.

3. A machine tool as set forth in claim 1 characterized in that the feed-driving means is composed of a linear motor.

4. A machine tool as set forth in claim 1 characterized in that the slide is provided with a tool hold mechanism for holding a tool.

5. A machine tool as set forth in claim 1 characterized in that a horizontally rotatable circular table is disposed on the table.

* * * * *